United States Patent
Pitkow (10) Patent No.: US 8,756,228 B2
(45) Date of Patent: Jun. 17, 2014

(54) METHOD AND APPARATUS FOR CREATING CONTEXTUALIZED FEEDS

(75) Inventor: James Edward Pitkow, San Francisco, CA (US)

(73) Assignee: Moreover Acquisition Corporation, Vienna, VA (US)

( * ) Notice: Subject to any disclaimer, the term of this patent is extended or adjusted under 35 U.S.C. 154(b) by 2247 days.

(21) Appl. No.: 11/357,293

(22) Filed: Feb. 16, 2006

(65) Prior Publication Data

US 2007/0198526 A1 Aug. 23, 2007

(51) Int. Cl.
*G06F 7/00* (2006.01)
*G06F 17/30* (2006.01)

(52) U.S. Cl.
USPC .......... 707/736; 707/754; 705/26.3; 705/27.1

(58) Field of Classification Search
None
See application file for complete search history.

(56) References Cited

U.S. PATENT DOCUMENTS

| | | | |
|---|---|---|---|
| 6,122,647 A | 9/2000 | Horowitz et al. | |
| 6,868,525 B1 * | 3/2005 | Szabo | 715/738 |
| 6,892,186 B1 | 5/2005 | Preist | |
| 2004/0078316 A1 * | 4/2004 | Clark et al. | 705/37 |
| 2005/0021609 A1 | 1/2005 | Houghton et al. | |
| 2005/0165615 A1 | 7/2005 | Minar | |
| 2005/0172024 A1 | 8/2005 | Cheifot et al. | |
| 2006/0122929 A1 | 6/2006 | Schoen et al. | |
| 2006/0173985 A1 | 8/2006 | Moore | |
| 2007/0156809 A1 * | 7/2007 | Dickinson et al. | 709/203 |
| 2007/0174340 A1 * | 7/2007 | Gross | 707/104.1 |
| 2007/0250428 A1 | 10/2007 | Rabenold et al. | |

OTHER PUBLICATIONS http://web.archive.org/web/20040812222649/http://www.thearhitect.co.uk/schemas/rss-2_0.xsd. the architect. XML Schema for RSS v2.0. Jorgen Thelin Date: Jun. 23, 2003.
International Search Report and Written Opinion, mailed Sep. 20, 2007, in related International Patent Application No. PCT/US2007/04074 filed Feb. 16, 2007.
International Search Report and Written Opinion, mailed. Feb. 15, 2008, in related International Patent Application No. PCT/US07/062317 filed Feb. 16, 2007.
Related U.S. Appl. No. 11/357,813, filed Feb. 16, 2006.
Related U.S. Appl. No. 11/043,682, filed Jan. 25, 2005.
PRN: "Pluck Selects Moreover Technologies . . . ," PR Newswire, Sep. 21, 2004, Dialog file 613 #0001338786, 3 pages.
Pluck.com :Internet Archive Wayback Machine, www.archive.org: ww.pluck.com; May 2005; 5 pgs.
Rupley, Sebastian: The never-ending search, PC Magazine, Jan. 2005, v24n1p26: Dialog file 16#12641698, 2 pgs.
Business Wire: "New Perch" Feature from Pluck Simplifies Shopping on eBay and Amazon.com, Nov. 16, 2004 Proquest #737082131, 3 pgs.
UU: Stepno, Bob "News on demand: tired of browsing . . . ," PC World, Jul. 2004, v22n7pg149; Dialog file 148#0017252069.

* cited by examiner

*Primary Examiner* — Sherief Badawi
*Assistant Examiner* — Loan T Nguyen
(74) *Attorney, Agent, or Firm* — Bryan G. Pratt; Holland & Hart LLP (57) ABSTRACT

A method and apparatus is disclosed herein for generating contextualized feeds. The method of generating contextualized feeds comprises receiving context data from a user. The method further comprises generating contextualized feeds based on the context data, as the context data is received. The method, in one embodiment, includes receiving a selection of one or more of the contextualized feeds from user, the selected feeds to be displayed with content entered by the user.

17 Claims, 6 Drawing Sheets

METHOD AND APPARATUS FOR CREATING CONTEXTUALIZED FEEDS

FIELD OF THE INVENTION

The present invention relates to the field of providing feeds; more particularly, the present invention relates to providing a contextual feed based on context data received from a user.

BACKGROUND OF THE INVENTION

The internet continues to expand as a source of information gathering and information distribution. Websites, computer desktops, and other computer applications that were once composed of static or fixed content, now provide live content to readers. Feeds can be incorporated into a user interface, either manually, by software, or through the use of online services, to provide relevant and up-to-date information, in the form of links, short textual excerpts, or a combination of both. Generally, a feed is created based on manual selection, a keyword search of content, constructed rules, or automated algorithms. The result is feed content consisting of a group of links, news headlines, podcasts, weblogs, etc.

A powerful feature of a feed is that it provides relevant data, such as news data, alongside the content created by the user. The feed generally represents current content. When new content is added to a feed, the old content is removed. Thus, the content consumer sees current information. Because of the ability to provide up-to-date information, feeds are typically incorporated into other content such as web sites, newsletters, weblogs, intranets, applications, kiosks, phones, set top boxes (i.e., cable television), Rich Site Summary (RSS) feeds, syndicated feeds, etc. However, one significant limitation of a feed is that the content of the feed is determined in advance.

One attempt to overcome the limitation of predetermined feed content is contextualized advertising. In contextualized advertising, a website may decide to include feeds that provide advertisements to the website, usually in the form of banner ads, pop-ups, advertisement frames, etc. The contextualized advertisement feeds includes the ability to analyze the content of a website and provide an advertisement relevant to the content currently being supplied by the website.

For example, a website utilizing contextualized advertising feeds may publish an article on a recent sporting event. The contextualized feeds would analyze the article and determine, for example, that a relevant advertisement would be for an online sports apparel store. Thus, when the reader views the article about the sporting event, the website is also supplied with the relevant advertisement related to the content within the website.

A drawback to contextualized advertisements is the possibility of displaying an inappropriate or unwanted advertisement on a website. If a website publishes an article harshly criticizing a major airline, analysis of the content by a contextualized advertisement service may pick up on references to the airline in the article. According to the discussion above, a contextualized advertisement server might then insert an advertisement for that airline into the website. However, supplying an advertisement for the airline to a website criticizing the airline would neither be relevant and/or appropriate. The problem described above would be true for any server that is attempting to add contextualized advertisements to a user interface.

Another approach to providing relevant content to a website is described by Yahoo™ Y!Q. Yahoo's Y!Q search service provides a website the ability to embed contextualized search features within a web page. The service analyzes the content of a web page and provides results based on the content. One drawback to YQ is that it requires a website publisher to first select what content will be used for contextualization purposes and second encode the content as a search icon within the webpage. Further, a reader of the website must manually trigger the search to receive relevant content. Thus, the experience is not automatic and requires the reader to seek out the additional information.

Both methods described above suffer from a further limitation. The news feeds and search criteria are determined by a user or server in advance of a website being published or the feeds being added to a user interface. As such, the user does not retain control over the feeds or content that he or she receives. Therefore, what is needed is a method for supplying feeds that have been contextualized in real-time with context data creation based upon context data and/or preferences of a user.

SUMMARY OF THE INVENTION

A method and apparatus is disclosed herein for generating contextualized feeds. The method of generating contextualized feeds comprises receiving context data from a user. The method further comprises searching available feeds and/or content and providing suggested contextually appropriate feeds to the user, as the server receives context data. The method further comprises receiving a selection of one or more feeds from the user. Furthermore, the method includes associating the selected one or more feeds with content, such that when the content is later viewed, the associated one or more feeds are displayed thereby providing the user full control over the feeds associated with the content.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for generating contextualized feeds in pseudo-real time is described. A user, through a user interface, interacts with data such as by creating content for a publication, entering data, editing data, reading data, clicking on a link or file, or simply by interacting with data as part of the user interface in the user's normal workflow. A feed contextualization tool then transmits context data, representing the created content, entered data, edited data, read data, clicking, or interaction, to a server through a network. The server generates contextual feeds based on the context data. In one embodiment, the server generates feeds by searching on the context data as the context data is received. In another embodiment, the server generates feeds by searching on the context data as it is being displayed to the user. The feeds generated by the server are then transmitted to the user interface of the feed contextualization tool.

In response to receiving the contextualized feeds, the feeds are displayed in a feed list for the user's review. The user, through the user interface, can choose to select, restrict, lock, or otherwise manage the feeds as they are generated. Furthermore, as the user continues to interact with content and/or data, the server continues to generate feeds. In one embodiment, the feeds are based on the new context data. In another embodiment, the feeds are based on the new and accumulated previous context data. The feeds generated in response to the accumulated and updated context data are transmitted to the user interface of the feed contextualization tool. In response to receiving the new feeds based on the updated context data, the feed list is updated and displayed to the user.

In one embodiment, feed generation may also be personalized based on past behavioral actions of the user. The user behavioral actions that impact feed generation and/or feed delivery may include generating feeds based on frequently received context data, generating feeds based on frequent user interactions with user interface, displaying frequently chosen restriction options within the user interface, etc. Furthermore, the user interface and/or feed contextualization tool may incorporate controls that enable the user to select preferences, disable preferences, enter preferences, etc. One skilled in the art will recognize the numerous options available for personalizing feed generation, selection, and display based on user behavior.

In one embodiment, the user can then choose to publish content including the selected feeds to a website. In another embodiment, the selected feeds continue to be displayed in the user's user interface as the user interacts with a computer system. In another embodiment, the selected feeds are associated with content and can be viewed on another device, such as a smart phone. The selected feeds may be stored in a memory of the server, or the restriction factors associated with the selected feeds are stored in a memory.

In the case of a content creator creating contextualized feeds for use by others, in response to a content consumer consuming the content creator's data including feeds, server provides the feeds selected by the content creator. For one embodiment, the server provides feeds to a website being viewed by a consumer. For another embodiment, the server provides the feeds to a user interface of the feed contextualization tool. In one embodiment, the server recalls the feeds stored in the memory. In another embodiment, the server generates feeds based on the recalled restriction factors. In either case, the content including feeds is displayed to the content consumer. This provides complete control to the user, who can choose which feeds to display, and restrict the feed selection by any available criterion. This also provides the user with relevant content, based on the context data, without requiring any effort or interaction.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
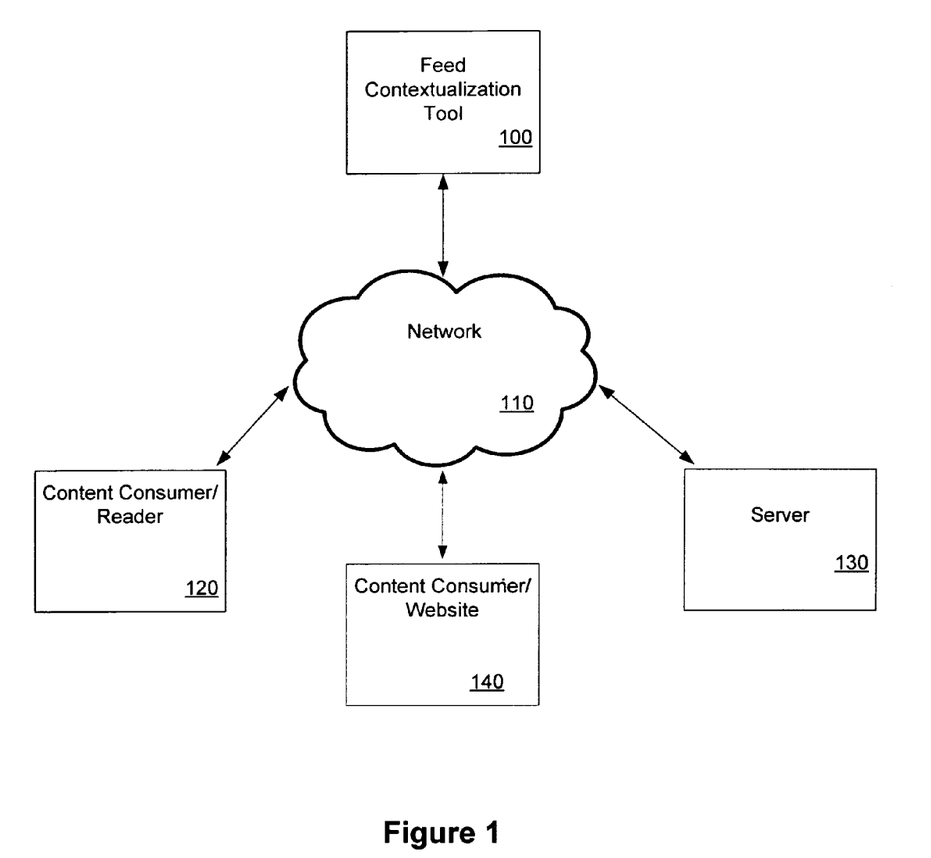
FIG. 1 is a network diagram of one embodiment of a network which may be used to implement the system.

FIG. 1 is a network diagram of one embodiment of a network that may be used to implement the invention, as described below. Feed contextualization tool 100 is coupled to a server 130 via network 140. For one embodiment, network 110 is an insecure network, such as the internet. The feed contextualization tool 100 may be coupled to the network 110 via a modem operating over telephony or cable lines, a digital subscriber line (DSL), a wireless connection, a local area network (LAN), or another type of connection.

Feed contextualization tool 100 may be used to run an application or access a web page. In one embodiment, the application used by feed contextualization tool 100 further includes an interface for content creation, which server 130 would receive as context data. In another embodiment, the user may run an application or process that monitors user interactions, such as a user entering data, editing data, reading data, clicking data, selecting files, etc., with a computing system, where the interactions are transformed into context data.

The context data, corresponding to content creation or user interactions, is transmitted to the server 130 through the network 110. The context data is then used by the server 130 to create and return feeds to the user based on the context data as it is received by server 130, e.g. contextualized feeds. Because the context data is received, contextualized, and then returned by server 130 as it is received, the user in turn receives contextualized feeds in real-time.

The application may also pass data from the feed contextualization tool 100 through the network 110 to the content consumer/reader 120 or content consumer/website 140, once that data is published to the content consumer website 140. If the data is published to a content consumer/website 140, stored on a web server (not shown), a content consumer/reader 120 can access the content from the content consumer/website 140. In other embodiments, the content consumer/reader can access content from a set-top box, kiosk, intranet, etc. Generally, content consumer/reader 120 would request content from content consumer/website 140, such as a weblog, where the weblog includes feeds. In response, content is returned by content consumer/website 140 including contextualized feeds to supply to the content consumer/reader 120, according to the discussion below.

For one embodiment, the server 130 may reside on the same system as the feed contextualization tool 100. As is known in the art, a single device may serve as both a server 130 and a client device, such as feed contextualization tool 100. In that instance, the context data being sent from feed contextualization tool 100 to server 130 is not sent via network 110, but rather internally. However, otherwise, the mechanisms described below are not substantively changed.

Figure 2:
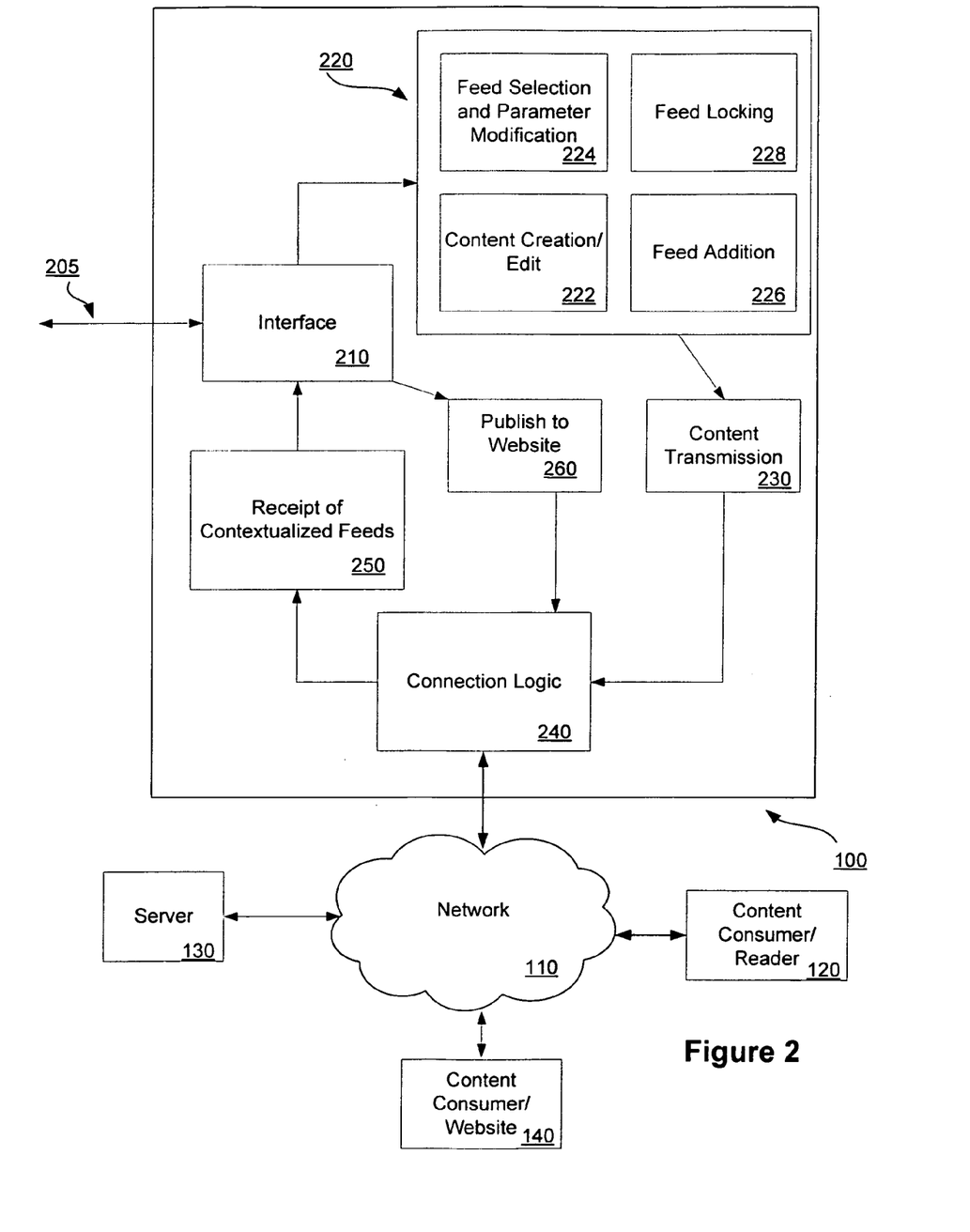
FIG. 2 is a block diagram of one embodiment of a feed contextualization tool used by a user.

FIG. 2 is a block diagram of one embodiment of the feed contextualization tool 100. Feed contextualization tool 100 elaborates on and provides more detail according to one embodiment of the system shown in FIG. 1.

Feed contextualization tool 100 includes interface 210 for interfacing with a user. In one embodiment, interface 210 performs in-out functions of the feed contextualization tool 100 so that the user can generate, enter, and/or edit data and content to be contextualized by a server as well as viewfeeds returned from server 130. In another embodiment, interface 210 monitors the interactions of a user, such as the user entering data, viewing data, editing data, selecting data, selecting files, selecting links, etc., with a computer system, which are transformed by the feed contextualization tool 100 to context data to be contextualized.

Feed contextualization tool 100 receives data or a command(s) entered by the user 220. Feed contextualization tool 100 can discern between data and commands that can be entered or selected by a user. A user may enter text 222 or edit preexisting text 222 or paste new text or images 222 in order to have contextual feeds generated. The feed contextualization tool 100 may also monitor interactions 222 of a user of a computer system, such as a user entering, editing, viewing, selecting data, etc. from the computer system. The feeds may be generated based on text entered by the user, based on sound data, image data, links, animations, based on meta data associated with an image, sound data, video data, link(s), animations, or any other form of content that can be included in a website, podcast, etc. Feed contextualization tool 100 receives content 222, in one embodiment as each letter is typed, in one embodiment as each word is completed, each sentence, paragraph, or other data unit is finished, etc. In one embodiment feed contextualization tool 100 prepares the content, as context data, for transmission logic 230 over network 110 to server 130. In one embodiment, the context data may be converted into a format suitable for data transmission over a computer network, such as network 110.

The data from transmission logic 230 is then provided to connection logic 240 for transmission over network 110. Connection logic 240 may be a modem, Ethernet card, or any other device for coupling feed contextualization tool 100 to network 110. Connection logic 240 then transmits data, comprising the context data or change(s) in context data, to server 130 so that server 130 can generate contextualized feeds based on the context data. The contextualization process of server 130 is described in more detail below.

After server 130 generates feeds based on the context data, the server transmits the feeds through network 110 back to connection logic 240. Thus, feeds 250 based on the context data created by the user are returned to the feed contextualization tool 100. Feed contextualization tool 100 receives the contextualized feeds 250, which can be one or more feeds, and transmits the feeds to interface 210. Interface 210 then displays, or otherwise communicates, the contextualized feeds to the user. In one embodiment, the information includes controls in addition to the contextualized feeds.

A user, through interface 210, can also issue a command or commands by requesting one or more of the following: feed lock 228, feed addition 226, or feed selection and parameter modification 224. Thus, as context data is created, the user can select feeds to add to content, lock feeds, lock selected feeds, modify the parameters that server 130 uses to generate feeds, etc. In one embodiment, this may be done via controls displayed along with the feeds. In another embodiment, commands may be entered along with the text that perform these functions. Alternative methods of entering commands/signals/indications may be used. However, locking a feed need not be a permanent locking, rather, a feed locking may consist of a restriction such as restricting a feed or selected feeds to a date range, provider, topic, etc. In one embodiment, feeds may be restricted by any available metadata. In one embodiment, this metadata includes:

Headline
    Source
    Category
    Stock Ticker
    Keyword
    Source Category
    Source Rank
    Source Location
    Region
    Language
    Genre
    Publisher
    User
    Author
    Duplicates Filter
    Sub, Reg, Prem Sources
    Number of Search Results
    Relevance vs Date Order
    Backscroll
    Date Range
    Last Article ID
    Geolocation Searches
        Location Type
        Region
        Subregion
        Country
        State
        Zip Area
        Zip and Postal Code
        Entity Name Furthermore, the restrictions on feeds may also be used to modify the parameters which the server uses to generate feeds.

Feed contextualization tool 100 transmits context data 220 to server 130. Because the server 130 generates contextualized feeds as context data is received, and permits controls such as add, lock, etc. as the context data is being created, the process of creating data and associated contextual feeds occurs in real time, or pseudo-real time.

For one embodiment, after the user has finished entering content or selecting commands to restrict feeds, the user can publish the content including the selected feeds. The user, through interface 205, can select a command to publish the content. The publish command is received by publisher interface 210. Then, logic 260 includes the feeds with the content in a format suitable for publication on a website, podcast, or any other published content format. The content, including the feed and/or feed identifier (in one embodiment a URL) is then transmitted to a content consumer/website 140—or other published location—through network 110 so that a reader (not shown) may later view, listen to, or otherwise experience the content including the feeds. In one embodiment, publishing logic 260 also transmits data using connection logic 240 through network 110 to server 130. The data includes the feeds and restriction criteria selected by the user, so that server 130 can store the feeds and restriction criteria in a memory.

Therefore, feed contextualization tool 100 vests a great deal of control of the feeds that are associated with the context data of the user. Advantageously, the user can select feeds, restrict feeds, lock feeds, and add feeds to content or a user interfaace in real-time as context data is created by contextual feed generation tool. The inappropriate feeds or unwanted feeds can be excluded by a user before the document, webpage, blog, etc. is published, or while the feeds are returned to user. The term "published" in this context means making data available to readers via a web site or other distribution mechanism.

Figure 3:
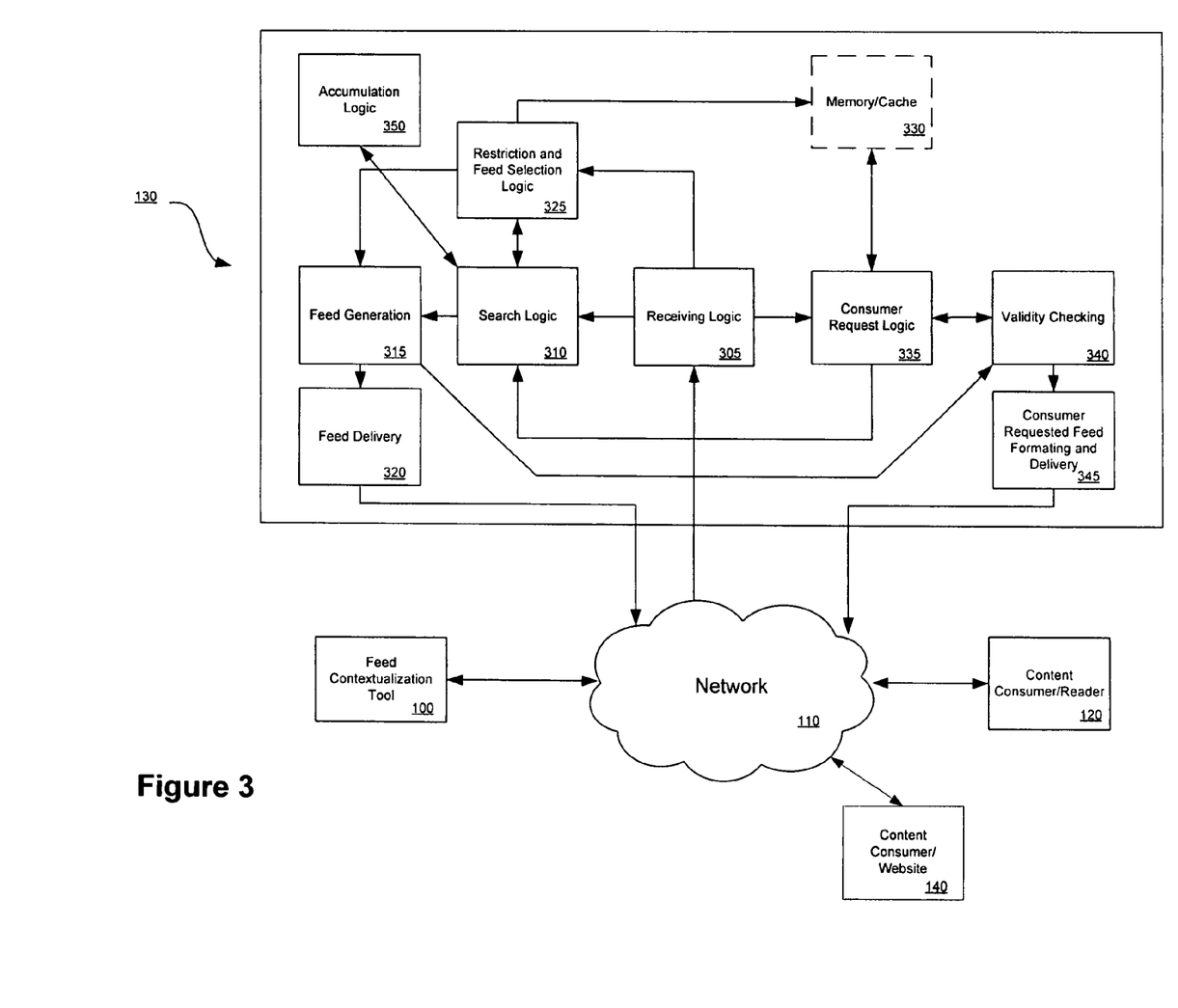
FIG. 3 is a block diagram of one embodiment of the contextual feed server.

FIG. 3 is a block diagram of one embodiment of the server. Server 130 includes a connection logic (not shown) for coupling server 130 to a network, such as network 110. The connection logic manages communication between server 130 and feed contextualization tool 100, content consumer/reader 120, and content consumer/website 140.

When a user creates or interacts with data, which is transformed to context data to be contextualized by server 130, the context data is received by receiving logic 305. In one embodiment, context data is received by server 130 in pseudo-real time. Context data, as discussed above, can be user interactions monitored by a feed contextualization tool 100, text, image data, sound data, metadata associated with image and sound data, etc. Receiving logic 305 can distinguish between context data received from feed contextualization tool 100, and a request for content including contextualized feeds received from content consumer/website 140 being accessed by a content consumer/reader 120.

Server 130 receives context data from feed contextualization tool 100 in varying data units. In one embodiment, server 130 receives context data as each letter is typed by a user. In another embodiment, server 130 receives context data as each word, sentence, paragraph, or other data unit is input by a user. In another embodiment, server 130 receives interactions in various data sizes such as data/application selection, viewed data, search requested, etc.

The context data is transferred to search logic 310 as server 130 receives the context data. Search logic 310 analyzes the context data, so that contextually appropriate feeds may be generated 315 by server 130. In one embodiment, search logic analyzes current context data and accumulated context data, so that the search is based on all of the accumulated context data received by the server 130. In one embodiment, search logic 310 analyzes the context data using a keyword search of the context data, or metadata for the context data when, for example, the metadata is data for context data consisting of image data. In another embodiment, search logic 310 analyzes the context data using a Boolean search of the context data or metadata for the context data. In yet another embodiment, natural language searching may be used to analyze the context data. Alternative methods of analyzing context data may be used.

After the search logic analyzes the context data, feed generation logic 315 generates feeds based on the analysis of search logic 310. Feed generation may consist of generating a link to a contextually appropriate website, news story within a website, image data, sound data, etc. Any content available for distribution and viewing over the internet, an intranet, podcast, etc. may be available as a possible feed by feed generation logic 315. In one embodiment, the feeds that are available to feed generation logic 315 are pre-analyzed data, stored in a database. In one embodiment, these feeds may be generated based on any website, news story, or any other digital data which is available to the system.

Feed delivery logic 320 then transmits the feed or list of feeds to feed contextualization tool 100 to update a feed list of the feeds received from server 130.

A user of the feed contextualization tool 100 may select feeds, lock feeds, restrict feeds, alter factors for feed generation, etc. When such a command is selected, receiving logic 305 receives the command. The command is then handled by restriction and feed selection logic 325. When the user selects a feed, restriction and feed selection logic 325 has the feed generated 315 and delivered 320 to user so that the user will know the feed was successfully selected. Further, feed contextualization tool 100 can be used to define criteria and/or preferences that effect how search logic searches for feeds. In one embodiment, the criteria may include one or more of data, data range, source, geographic location, etc. An exemplary listing of such factors is discussed above. As such, search logic can be used to fine-tuned to feed generation according to a user's preferences. In one embodiment, these preferences may be set on a case-by-case basis. In another embodiment, these preferences may be entered once, and applied globally or to a subset of entries, based on the user's preferences.

Feed contextualization tool 100 may also be used to select a feed list, for integration into content, subject to either a lock or a restriction. In one embodiment, restriction and feed selection logic 325 stores the locked feeds in a memory 330. Thus, the feeds can later be recalled from memory 330 by a reader in the state they existed when locked or restricted by the user. Furthermore, the restrictions are stored as well. Thus, the restrictions can later be recalled from memory 330 so that server can generate a feed list based on the stored feed restriction associated with the context data. In one embodiment, memory 330 is a cache memory within server 130. In another embodiment, memory 330 is an external memory coupled to server 130. In this case, the external memory could be a cache memory, database, or any other apparatus capable of storing locked feeds or feed restrictions. The varying embodiments of memory 330 are denoted by the dashed lines representing the memory of FIG. 3.

A content consumer/reader 120 may also view a content consumer/website 140 through network 110, where the website contains content including locked or restricted feeds. In this case, content consumer/website 140 would request the feeds from the server 130. In one embodiment, the information for the locked feeds triggering the request may be contained within URL code for the website or content.

For one embodiment, consumer request logic 335 will process the request according to the nature of the feeds. If the feeds are restricted by a locking restriction requirement, in one embodiment the feeds will be displayed in the state that they existed when the user locked the feeds. For locked feeds, request logic 335 recalls the locked feeds from memory 330. After the locked feeds are recalled from memory 330, in one embodiment, each feed is checked for validity by validity checking logic 340.

Because the feeds were locked by the user some time prior to being accessed, the website or source of the feed may not currently be providing the original data referenced in the feed. In such a case, the feed would ordinarily not be presented to a content consumer. However, in one embodiment, the feeds and associated data subject to a locking restriction are stored in memory 330 so that the feeds and content can be provided by memory 330 to content consumer/website 140 and/or feed contextualization tool 100. Thus, in one embodiment, the feeds and the content are stored so that the source need not provide the feed, but rather the feed is retrieved from memory 330. In this embodiment, a user need not run the risk that the feeds selected by the user will no longer be valid when requested by a reader. Advantageously, this ensures the original integrity and creation of the content, so that a content consumer views the content and associated feeds exactly as desired by the user. In one embodiment, this feature is only available if the feed data provider consents to it.

In one embodiment, if the feed and associated data is not stored in memory, then expired feeds are removed prior to the presentation of the content to the user. In another embodiment, expired feeds remain, but are grayed out, or another indication that the feed data is no longer available is made.

As noted above, content consumer/website 140 may also contain content including feeds which were subject to one or more restriction criteria or factors. In this case, consumer request logic 335 recalls the restriction criteria from memory 330. In another embodiment, the restriction criteria are encoded in the URL representing the feeds. In either case, search logic 310 applies the restriction criteria to a search so that feed generation logic 315 can generate feeds subject to the restriction requirements. In one embodiment, validity checking logic 340 ensures that the feeds generated by feed generation logic 315 are still valid and meet the restriction criteria, as originally defined by the user. Feed formatting and delivery logic 345 then formats the feeds for the target platform and transmits the feeds to content consumer/website 140 though network 110 so that content consumer/reader 120 can view the content including feeds.

Figure 4:
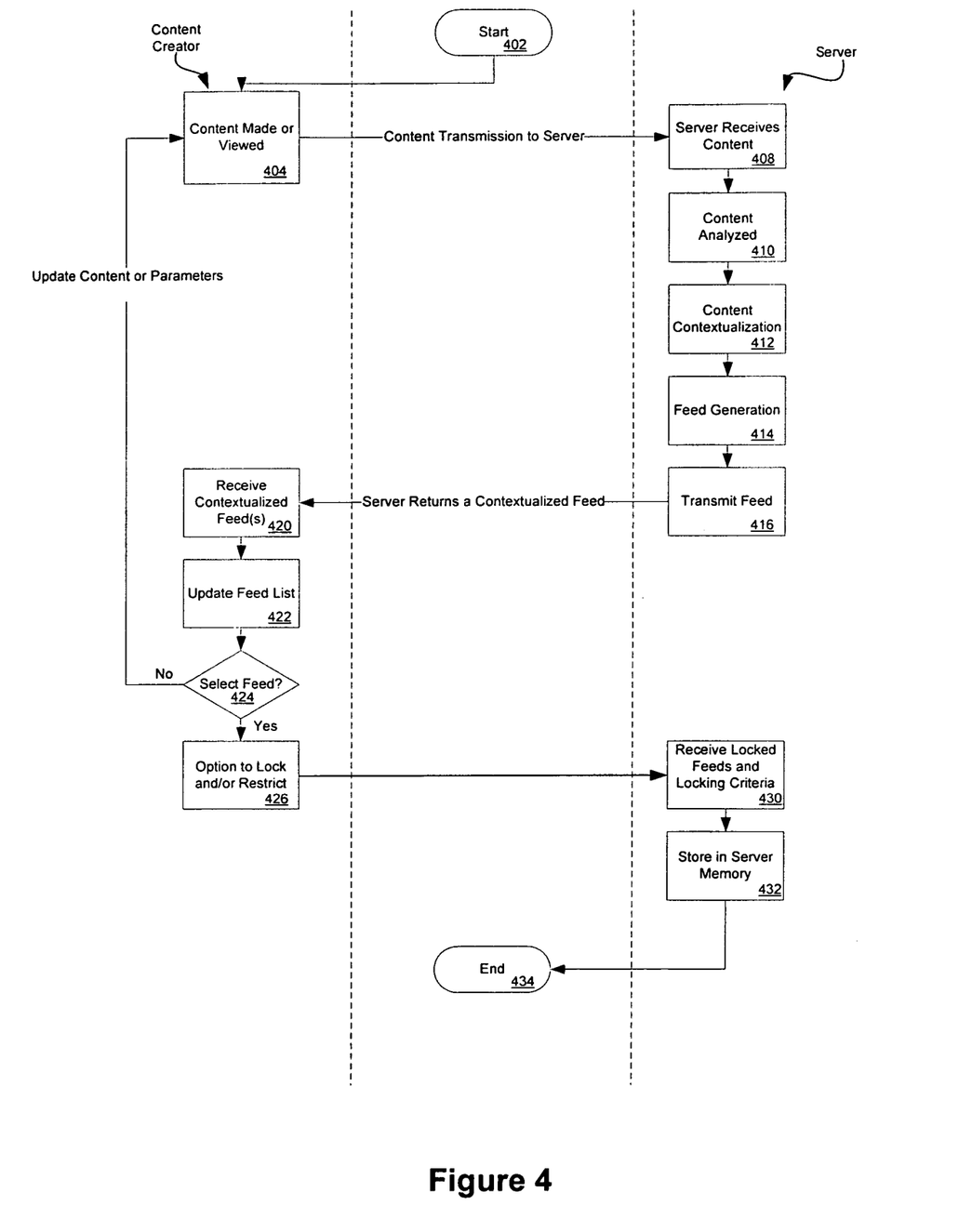
FIG. 4 is a flowchart of one embodiment of generating contextualized feeds.

FIG. 4 is a flow diagram illustrating one embodiment of a method for generating contextualized feeds. The process is performed by processing logic that may comprise hardware (circuitry, dedicated logic, etc.), software (such as is run on a general purpose computer system or a dedicated machine), or a combination of both. The process starts at block 402 when context data is created. In one embodiment, the process starts when a user enters content, such as by entering text into a feed contextualization tool. In another embodiment, the process starts when a feed contextualization tool monitors the interactions of a user of a computing system, such as the user entering data, editing data, viewing data, selecting data and/or links, etc., and transforms the monitored interactions into context data to be contextualized.

As discussed above, the user may enter content, including text, image data, video data, or other format data, which is transformed into context data. The user may also enter control commands, including feed restriction parameters, feed locking parameters, feed selection, etc. Furthermore, the feed contextualization tool may transform user interactions on a computer system, such as viewing data, requesting data, opening applications, etc., into context data.

Context data is then transmitted to the server through a network, where the server receives the context data 408. In one embodiment this occurs on a word-by-word basis. In another embodiment, this occurs on a character-by-character basis. In another embodiment, this occurs at the end of each sentence or paragraph. In another embodiment, this occurs after each user interaction or group of interactions with a computer system. Alternative pseudo-real-time segments may be created.

The server then analyzes the context data 410. In one embodiment, context data analysis can include keyword searching the context data. In another embodiment, context data analysis can include Boolean searches based on the context data. In another embodiment, natural language analysis may be applied to identify the meaning of the context data.

The analysis is then used to create a search based on the thus-far received context data 412. In one embodiment, the search is based on all of the accumulated context data received during this session. In another embodiment, the system further acquires past data that is visible on the same page as the currently-entered context data, and creates "full context" searches. In another embodiment, the search is based on a subset of the context data received during the session. The subset may range from a sentence, to a paragraph, to a story, to any other logical division of text. In one embodiment, a database of feeds is searched. In one embodiment, the metadata, including keywords, associated with the feeds is searched. The database, in one embodiment, includes an up-to-date collection of available feed data, such as news.

From the results of the search, the server generates one or more feeds 414. The server then returns the contextualized feeds generated at processing block 414 to the feed contextualization tool.

The feed contextualization tool then receives the contextualized feeds 420, which may be transmitted over a network similar to network 110 discussed above. The feed contextualization tool will then update the feed list displayed to the user according to the feeds received from the server. If the feed contextualization tool is already displaying contextualized feeds based on prior data, the list will be updated with the new feeds. However, if the feed contextualization tool is receiving feeds for the first time, the feed list is populated with the feeds received at processing block 420.

Once the feed contextualization tool has received feeds 420 and the feed list has been updated 422, the user may select one or more feeds 424. However, the user does not need to select a feed. In either case, the user can continue to create create context 404, such as by interacting with a computing system or feed contextualization tool. In this case, as the user creates, edits, adds, or deletes data, the server generates updated feeds and the user's feed list is updated accordingly, repeating processing blocks 404-422.

If the user selects a feed 424, that feed is displayed or added to the appropriate location. In addition to the command of selecting a feed, the user can then choose to restrict or lock the feed(s) based on various preferences 426, as discussed above. The user may then continue to edit data, interact with a computer system, and/or edit feed parameters. In one embodiment, the user can choose to publish content which was created. For simplicity, the created content will be referred to herein as a "document" although it may be a web page, a blog entry, a podcast, or any other form of data.

When the user elects to publish a document, including feeds generated by the server, the process continues to block 430. The feed contextualization tool transmits the selected feeds, as well as the locked feeds or restricted feeds, including the restriction criteria, to the server 430. In one embodiment, the server will then store the feeds and/or restriction criteria in a memory 432. The process then ends at block 434.

Figure 5:
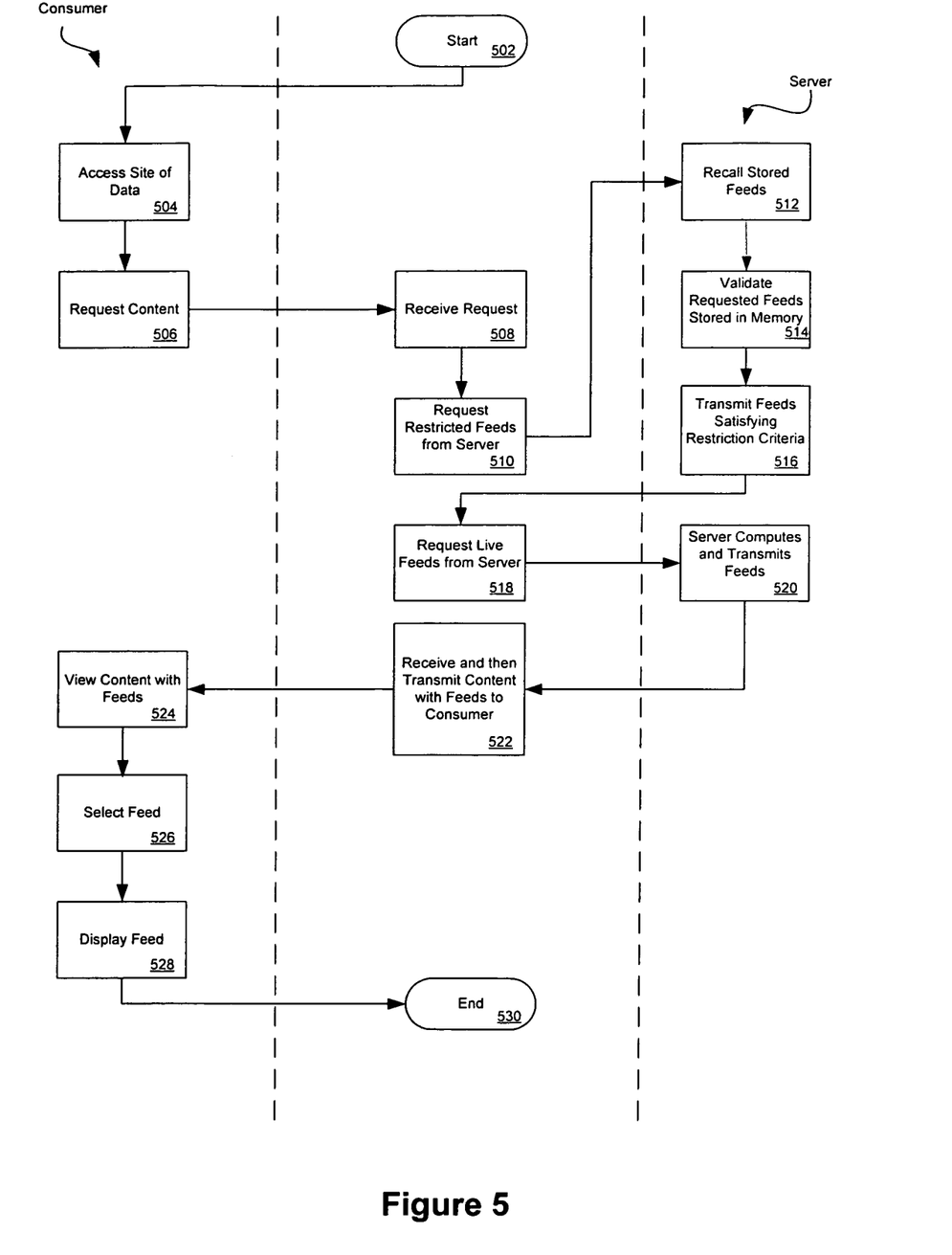
FIG. 5 is a flowchart of one embodiment of a content consumer viewing contextualized feeds.

FIG. 5 is a flowchart of one embodiment of a content consumer viewing contextualized feeds. A content consumer may be a user reading a web page, a blog, or other content created by a user. In one embodiment, the content consumer may be accessing the data directly or through a client device. The process is performed by processing logic that may comprise hardware (circuitry, dedicated logic, etc.), software (such as is run on a general purpose computer system or a dedicated machine), or a combination of both. The process starts at block 502 when a consumer accesses content and contextualized feeds.

A consumer accesses the site of the data 504. Included in the content is at least one contextualized feed selected by the user. The feed may be subject to a restriction or locking. The consumer requests the content 506. In one embodiment, this is an automated request, such as the request sent when a user types in a particular URL (universal resource locator).

The request is received 508. In one embodiment, the request is processed by an internet server that controls a website. Included in the website being accessed is URL, HTML, XML, or any other coding format for website content, encoding the identity of the feeds. In one embodiment, the coding may also include the locking or restriction information.

In order to display the content including the feeds, the website then requests 510 the restricted and/or locked feeds from the server, similar to server 130. In one embodiment, the server will read 512 the feeds from a memory, where the memory is either an internal or external memory to the server. In another embodiment, restriction criteria are read from a memory so that feeds can be generated based on the stored restriction criteria.

In one embodiment, the feeds, which are either read from memory or generated by the server, are validated 514 by the server. In one embodiment, the feeds stored in memory are validated to ensure feed data is available from the original source.

Next, the server transmits the feeds have been validated to the website. Thus, a user (not shown) can ensure that the contextually appropriate feeds, selected by the user, are displayed to a consumer who views the user's content.

If there are live feeds, i.e. feeds not subject to a locking or restriction requirement, the website will then request the live feeds from the server 518. The server can generate the live feeds 520 and return them to the website.

The website can then display the requested content including the appropriate feeds to the consumer. The website transmits the content with feeds to the consumer 522. The consumer can then view and interact with the content including the locked and live feeds. In one embodiment, consumer consumes content by viewing content and feeds on a website. In another embodiment, the user can consume the selected and/or restricted feeds.

The consumer can select a feed 526, for example by clicking on a link or passing a mouse pointer over the feed. As is well known in the art, there are numerous ways of selecting an object on a website. The consumer can then choose to display the data associated with the feed 528 and pursue the content contained in the feed.

Although a content consumer/website and the server are shown as distinct elements in FIG. 5, in one embodiment the website can reside on a website server that includes a contextualized feed generation server.

Figure 6:
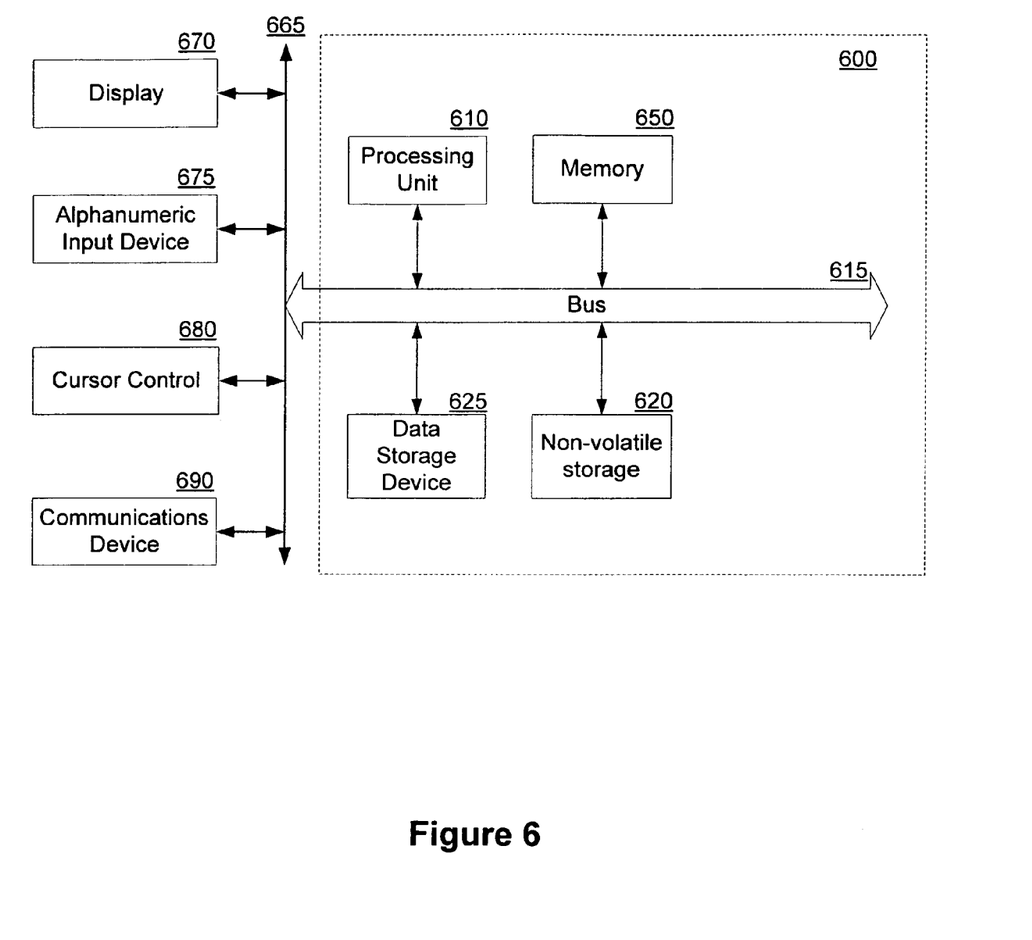
FIG. 6 is a block diagram of one embodiment of a computer system which may be used with the present invention.

FIG. 6 is one embodiment of a computer system on which the present invention may be implemented. It will be apparent to those of ordinary skill in the art, however, that other alternative systems of various system architectures may also be used.

The data processing system illustrated in FIG. 6 includes a bus or other internal communication means 665 for communicating information, and a processor 660 coupled to the bus 665 for processing information. The system further comprises a random access memory (RAM) or other volatile storage device 650 (referred to as memory), coupled to bus 665 for storing information and instructions to be executed by processor 660. Main memory 650 also may be used for storing temporary variables or other intermediate information during execution of instructions by processor 660. The system also comprises a read only memory (ROM) and/or static storage device 620 coupled to bus 665 for storing static information and instructions for processor 660, and a data storage device 625 such as a magnetic disk or optical disk and its corresponding disk drive. Data storage device 625 is coupled to bus 665 for storing information and instructions.

The system may further be coupled to a display device 670, such as a cathode ray tube (CRT) or a liquid crystal display (LCD) coupled to bus 665 through bus 665 for displaying information to a computer user. An alphanumeric input device 675, including alphanumeric and other keys, may also be coupled to bus 665 through bus 665 for communicating information and command selections to processor 660. An additional user input device is cursor control device 680, such as a mouse, a trackball, stylus, or cursor direction keys coupled to bus 665 through bus 665 for communicating direction information and command selections to processor 660, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 660.

It will be apparent to those of ordinary skill in the art that the system, method, and process described herein can be implemented as software stored in main memory 650 or read only memory 620 and executed by processor 660. This control logic or software may also be resident on an article of manufacture comprising a computer readable medium having computer readable program code embodied therein and being readable by the mass storage device 625 and for causing the processor 660 to operate in accordance with the methods and teachings herein.

The present invention may also be embodied in a handheld or portable device containing a subset of the computer hardware components described above. For example, the handheld device may be configured to contain only the bus 665, the processor 660, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 660, a data storage device 625, a bus 665, and memory 650, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 660. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
    receiving context data from a user in the form of created content, wherein the context data received from the user is received in pseudo-real time;
    generating contextual feeds based on the context data as the context data is received;
    receiving a selection of one or more of the contextual feeds from the user, wherein the contextual feeds based on the received context data are generated in pseudo-real time;
    restricting the selected one or more feeds by the one or more factors;
    encoding the restriction in a universal resource locator code (URL) associated with the one or more feeds; and
    associating the selected one or more contextual feeds with the created content, wherein when the created content is viewed, the associated one or more contextual feeds are displayed, and wherein the user is provided control over the feeds associated with the content.

2. The method of claim 1, further comprising:
    receiving at least one of:
        a user command, the user command commanding an action of a server; and
        a restriction request restricting the selected one or more contextual feeds by one or more factors.

3. The method of claim 2, wherein the factors include at least one of a headline, source, category, stock ticker, keyword, source, region, language, genre, publisher, author, duplicate filter, sub-requests, search results, data, geolocation.

4. The method of claim 1, wherein the context data is in the form of created content selected from created content consisting of one or more of: text, audio and visual data entered or added by the user, and metadata associated with the text, the audio, and the visual data.

5. The method of claim 4, wherein the context data further includes preferences of the user as to the contextual feeds.

6. The method of claim 1 further comprising:
    updating the contextual feeds upon receiving additional context data from the user.

7. The method of claim 1 further comprising:
    receiving a request for content containing the selected one or more feeds;
    performing a search on a database of available feeds based on criteria associated with the selected one or more feeds; and
    presenting results of the search along with the content to a content consumer.

8. The method of claim 2, further comprising:
    receiving a request for the selected one or more restricted contextual when a content consumer consumes the content;
    recalling the selected one or more feeds stored in the memory;
    checking the validity of the recalled feeds; and
    returning valid feeds, to the content consumer.

9. The method of claim 1, wherein the user is a publisher for publishing content including feeds to a website.

10. The method of claim 9, further comprising:
    receiving context data from the publisher as a user of the publisher is entering content into the publisher.

11. The method of claim 1, further comprising:
    the user monitoring the interactions of a user of a computing system; and
    transforming data corresponding to the monitored interactions into context data.

12. An article of manufacture including one or more physical computer-readable storage media that embody a plurality of instructions, which when executed by one or more processors in a processing system, causes the one or more processors to performing a method, the method comprising:
    generating contextual feeds based on context data in the form of created content data the created content is received from a user, wherein the context data received from the user is received in pseudo-real time;
    receiving a selection of the one or more feeds from the user, wherein the contextual feeds based on the received context data are generated in pseudo-real time;
    restricting the selected one or more feeds by the one or more factors;
    encoding the restriction in a universal resource locator code (URL) associated with the one or more feeds; and
    associating the selected one or more feeds with the created content received from the user so that when a content consumer requests the created content to display, the associated one or more feeds are displayed.

13. The article of manufacture of claim 12, the method further comprising:
    receiving a request, from the user, to restrict the selected one or more feeds by one or more factors including at least one of a headline, source, category, stock ticker, keyword, source, region, language, genre, publisher, author, duplicate filter, sub-requests, search results, data, geolocation.

14. The article of manufacture of claim 13, the method further comprising:
    receiving a request form a content consumer for content associated with the one or more restricted feeds; recalling locked feeds from the memory;
    recalling restriction factors from the memory to generate available restricted feeds by performing a search on a database of available feeds based on the factors recalled from memory checking the validity of the locked feeds and the available restricted feeds; and
    returning the valid feeds to the content consumer.

15. The article of manufacture of claim 12, wherein the user is a publisher for publishing content including feeds to a website.

16. The article of manufacture of claim 12, the method further comprising:
    receiving context data from the publisher as a user of the publisher is entering content into the publisher.

17. The article of manufacture of claim 12, the method further comprising:
    monitoring the interactions of a user of a computing system; and
    transforming data corresponding to the monitored interactions into context data.

* * * * *